United States Patent [19]

Bloch et al.

[11] 4,173,714

[45] Nov. 6, 1979

[54] COMMUNICATION CIRCUIT WITH COMBINED POWER FEED AND DATA TRANSMISSION OVER A PHANTOM CHANNEL

[75] Inventors: Alan Bloch, New York; Frank A. Coviello, Peekskill, both of N.Y.; Ira Guzik, Fairfield; Candido Puebla, Bridgeport, both of Conn.

[73] Assignee: TIE/Communications, Inc., Stamford, Conn.

[21] Appl. No.: 803,243

[22] Filed: Jun. 3, 1977

[51] Int. Cl.$^2$ .............................................. H04Q 5/18
[52] U.S. Cl. ................................ 179/99 R; 179/15 BB
[58] Field of Search ................... 179/3, 4, 15 BB, 99

[56] References Cited

U.S. PATENT DOCUMENTS

| 2,203,316 | 6/1940 | Weissner | 179/15 BB |
|---|---|---|---|
| 3,701,854 | 10/1972 | Anderson et al. | 179/99 |
| 3,787,631 | 1/1974 | Lewis | 179/99 |
| 3,843,845 | 10/1974 | Ridley | 179/99 |
| 3,973,085 | 8/1976 | Shiff | 179/99 |
| 3,975,594 | 8/1976 | Guntersdorfer | 179/15 BB |
| 4,046,972 | 9/1977 | Huizinga et al. | 179/99 |

FOREIGN PATENT DOCUMENTS 1437032 5/1976 United Kingdom .

Primary Examiner—Bernard Konick
Assistant Examiner—Randall P. Myers
Attorney, Agent, or Firm—Francis N. Carten

[57] ABSTRACT

The disclosure relates to a four conductor circuit arrangement providing two communication channels between a control unit and a terminal device. Power feed and bi-directional signalling are accomplished simultaneously over the same four conductors used for the two commmunication channels without interference. The signalling from the control unit to the terminal is accomplished by means of a voltage modulator circuit in the control unit by which voltage pulses are transmitted via a phantom circuit arrangement over the four conductors to the terminal unit. The voltage pulses are sensed from the phantom circuit in a data receiver which is located at the terminal unit. Connected to the phantom circuit in the terminal unit is a voltage regulator circuit which receives power from the control unit via the four conductor phantom circuit interconnecting the control unit and the terminal. In series with the voltage regulator circuit is a constant current sink and an inductor. A current modulator circuit is provided in parallel for impressing current data pulses generated in the terminal onto the phantom circuit, which are, in turn, received by a receiver circuit in the control unit.

A preferred data format is disclosed as a method for transmitting information between the control unit and the terminal.

The preferred embodiment for the disclosed four conductor communication circuit and the disclosed data format is in a key telephone system in which the control unit is a station card in a key service unit and the terminal is a key telephone station set.

12 Claims, 8 Drawing Figures

COMMUNICATION CIRCUIT WITH COMBINED POWER FEED AND DATA TRANSMISSION OVER A PHANTOM CHANNEL

BACKGROUND OF THE INVENTION

1. Field of the Invention

This invention relates to a circuit arrangement for providing communication channels and power and signalling circuits between a control unit and a terminal. Specifically, the invention relates to such a circuit arrangement in a key telephone system.

2. Description of the Prior Art

There has been a continuing effort on behalf of the telephone industry to reduce the cabling and cross-connecting equipment requirements for key telephone systems. These requirements are based in the desire to allow a key telephone set to be interchangeable, and also for the desire to reduce service assignments at the telephone sets. So called electronic key telephone systems have been proposed in recent years in an effort to reduce the cabling and cross-connecting requirements of the older key telephone systems, and in addition provide features not possible in the prior systems.

For example, in a series of papers published at the 1970 International Conference on Communications, an electronic key telephone system is described in which the control unit and each telephone station set is interconnected by means of six conductors. Two of these six conductors are used for a voice circuit communication channel. The other four conductors are used for data transmission: two conductors for transmission in one direction; the other two conductors for data transmission in the other direction. One paper presented at the 1970 International Conference on Communications entitled "Exploratory Common Control Key Telephone System: System and Functional Description", by L. P. Fabiano, Jr. of Bell Telephone Laboratories, Inc., describes how the six conductor circuit arrangement among four of the six conductors is used to transmit data to and from each station set and how four of the conductors are connected in a phantom pair arrangement for power transmission. Each conductor pair has a center tapped transformer connected both at the control unit and at the station set. Power is supplied from the control unit to the station set over the phantom pair arrangement, while data in one direction is being supplied on one pair of the four conductors and data from the station set to the control unit is being returned over the other pair of the four conductors. The other two leads of the total of six leads, as mentioned above, are used only as a communication channel.

Key telephone systems have been known in which station sets are controlled and powered from a control unit via only four conductors connecting the control unit and each station set. For example, British Pat. No. 1,437,031, assigned to the Plessey Company Limited of Great Britain, describes a four conductor circuit arrangement which connects the control unit for a telephone system to each station set. This British patent describes a "house telephone system" in which the four conductors connecting the control unit to the terminal are divided into two pairs of conductors, one pair being used for power feed and bi-directional signalling, the other pair being used solely as a communication channel or voice circuit path between the station set and the control unit.

The power feed and bi-directional signalling arrangement is described in British Pat. No. 1,437,032, also assigned to the Plessey Company. Power is transmitted from the control unit to the terminal by way of two conductors; simultaneously, data signals, generated in the control unit, are transmitted over the same two conductors to the terminal where they are sensed by a data receiver and applied to the station set. At the station set itself, a series regulator senses the voltage impressed on the two conductors and regulates that voltage in order to supply the terminal station set with d.c. voltage. In series with the series regulator is a constant current source, which is modulated by a current modulator in response to data generated by the terminal. The data generated by the terminal gives information about the characteristics of the terminal itself, and these data are transmitted over the two conductors back to the control unit where they are sensed by a receiver responsive to the current pulses and are used in the terminal to control the terminal itself.

In modern communication systems, such as key telephone systems, there is often a requirement that there be two communication channels connecting the control unit and the terminal. For example, in a key telephone system it is often desirable that a user of a key telephone station set, who is communicating over a first channel, (for example on an outside call over a central office line) be able to simultaneously talk over a second communication channel to someone connected to the key telephone system over an intercom line. Thus, there is a requirement that there be provided not one, but two audio communication channels over the four conductors connecting the control unit and the terminal, with the simultaneous provision of data signalling in both directions (from the control unit to the terminal and from the terminal to the control unit) with simultaneous provision of power being supplied from the control unit to the terminal over the four conductors.

Thus this invention provides a circuit arrangement in which a control unit and a terminal are interconnected by means of only four conductors and in which two communication channels, bi-directional signalling between the control unit and the terminal and power transmission from the control unit to the terminal is provided.

This invention also provides a method for transmitting control data over the four conductor arrangement by which various circuits in a key telephone station set may be controlled and/or monitored. The invention further provides a method of dial pulse signalling simultaneously with control data transmission.

SUMMARY OF THE INVENTION

This invention relates to a circuit arrangement in which first and second communication channels are provided over two conductor pairs which are simultaneously used for power feed and bi-directional signalling between first and second equipment units. These first and second equipment units, in a preferred embodiment, are a control unit and key telephone station sets in a key telephone system.

A first pair of conductors is used as one information channel. The other pair of conductors provides the second information channel. Each conductor pair is terminated at the control unit and at the terminal unit with a transformer. Each transformer has one center tap winding, the ends of the center tapped winding being connected to the conductor pair.

The communication channels, typically audio channels, are created by using each pair of conductors via transformer coupling to the terminal and to the control unit, there being an information receiver (typically a small speaker) and generator (typically a microphone) for each channel in the terminal and there being means to receive and transmit information for each channel at the control unit.

Data information flow between the control unit and the terminal and power feed from the control unit to the terminal is accomplished via a phantom pair circuit arrangement in which the control unit circuitry is connected to the two center taps of the transformers terminating the two pair of conductors at the control unit. Connections to the center tap connections of the transformers terminating the two conductor pairs at the terminal complete the phantom pair circuit. A d.c. voltage source is connected at the control unit to the phantom pair circuit arrangement. The d.c. voltage is applied to the phantom circuit arrangement, and is sensed and regulated by a voltage regulator in the terminal connected in series at the terminal end of the phantom pair.

Data signals are applied to the phantom pair at the control unit by means of a voltage modulator. These data signals, transmitted from the control unit to the terminal, are sensed at the terminal end of the phantom pair by means of a data receiver. Information is transmitted to the control unit from the terminal by modulating a resistor in parallel with a constant current sink at the terminal end of the circuit arrangement. This provides current modulation of the constant current in the terminal circuit connected to the phantom pair. Current pulses therefore are applied via the phantom pair, the pulses being sensed in the control unit by means of a data receiver. An additional feature of the invention provides at the terminal end of the circuit arrangement, an inductor selected so that the terminal circuit presents a very high impedance to the phantom pair line as viewed from the control unit end of the arrangement, thereby preventing signal reflections returning to the control unit from the terminal end. A very high impedance also aids in the generation of current pulses which result from modulation of the constant current sink in the terminal circuit.

According to another feature of the invention, the data to each terminal is provided by means of dividing time into N segments, where N is preferably selected to be the integer 34. Each of these N segments, called a word, is further divided into five sub-time elements. A pulse during the first of these time elements of a word is used in each word to indicate the start of a new word. A second element is used to transmit pulses from the control unit to the terminal indicating control information about a particular terminal circuit. A third time element during each word is used to transmit status information about a particular terminal circuit from the terminal to the control unit. The other time elements are left idle in each word. Typically the first word, labeled the 0th word is used as a synchronizing word, and the following N-1 words are used to convey information between the control unit and the terminal about individual terminal circuits.

When the inventive data format is used in the preferred embodiment of a key telephone system, information concerning the condition of the hookswitch and the presence of a dial pulse during signalling is transmitted during the first time interval of each word by sending a current pulse from the key telephone station set to the key service unit.

BRIEF DESCRIPTION OF THE DRAWINGS

The invention will be described by referring to the accompanying drawings, in which.

DESCRIPTION OF THE INVENTION

General Description of The Circuit Arrangement

Figure 1:
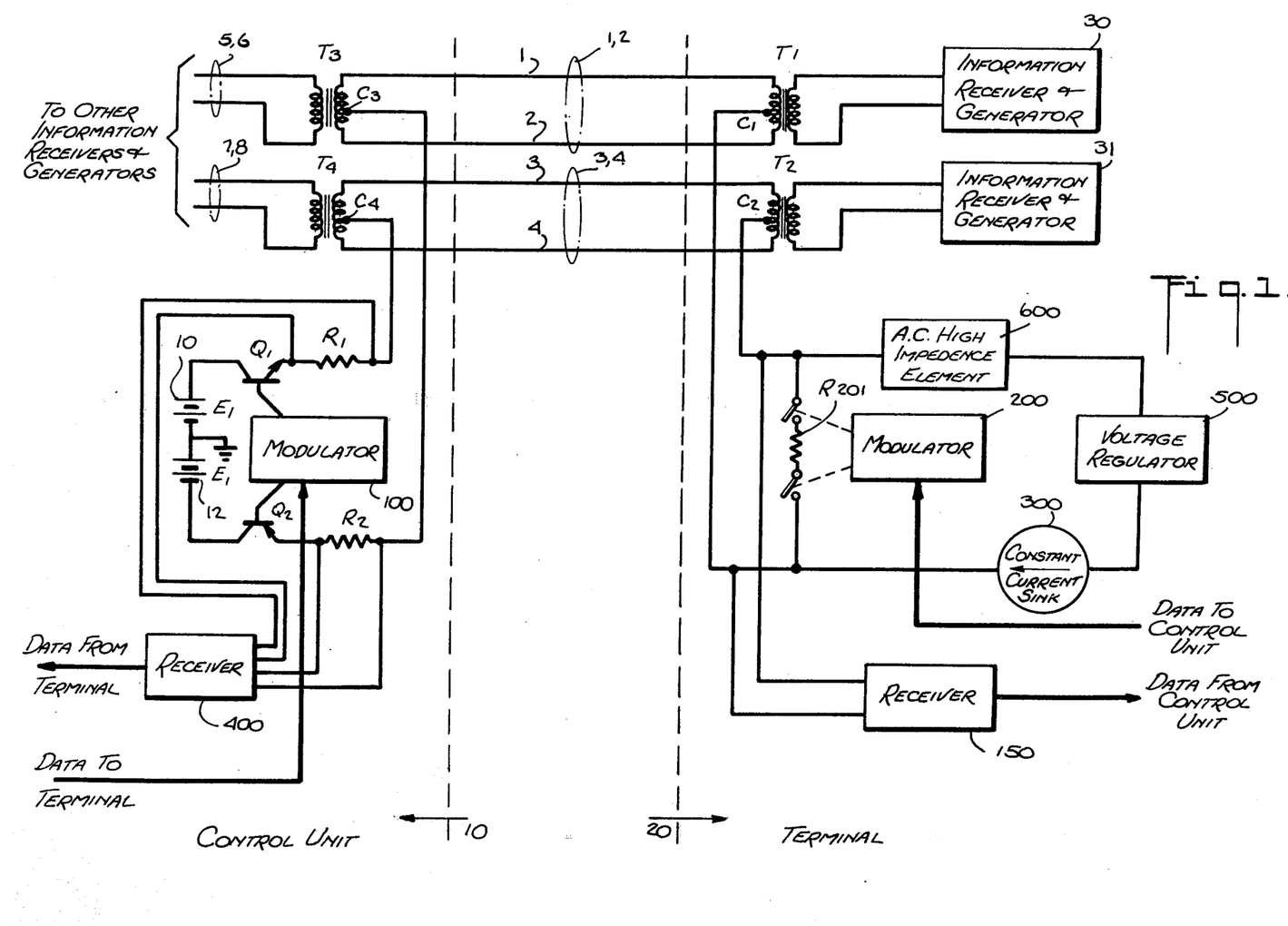
FIG. 1 shows in block diagram form the circuit arrangement by which two communication channels and means for supplying power from the control unit to the terminal, transmitting data from the control unit to the terminal, and transmitting data from the terminal to the control unit are provided over four conductors connecting the control unit and the terminal.

FIG. 1 shows in block diagram form the general aspects of this invention. Four conductors, 1,2,3,4 are shown connecting a control unit 10 and a terminal 20. Although the preferred application for the invention is in a key telephone system, the inventive circuit arrangement can find application in many different control unit/terminal applications.

Each conductor pair is terminated by a transformer. Transformers T1 and T2 terminate the conductor pair 1, 2 and conductor pair 3, 4 in terminal unit 20 while transformers T3 and T4 terminate the conductor pair 1 and 2 and conductor pair 3 and 4 in control unit 10.

Each transformer has a center tap connection on the transformer winding connected to the conductor pair. Center tap connections are located at the control unit 10 (C3 and C4) and at the terminal unit 20 (C1 and C2). A "phantom circuit" is created via the center tap connections C1 and C2, through the conductors 1,2,3,4, to the center taps C3 and C4 of transformers T3 and T4. This arrangement is known as a phantom pair because in a closed circuit connected to taps C3 and C4 of T3 and T4 and to taps C1 and C2 of T1 and T2, the current supplied at a center tap point will divide at the center tap connection flow over two conductors and be received in recombined form at the other end.

Connected to both conductor pairs 1,2 and 3,4 at each end is circuitry necessary to create a complete communication channel. For example, at the terminal 20 end of transformer T1, connected to pair 1,2, is a circuit 30, which can be a transmitter and receiver set commonly found in a telephone handset. Circuit 31, which is connected to transformer T2, is an information receiver and generator which might be a built-in microphone and speaker of a telephone station. Connected to the side opposite pair 1,2 of transformer T3 in control unit 10, is a conductor pair 5, 6. Connected to the other side of transformer T4 is a conductor pair 7,8 which may be connected by other circuits in the control unit to other information receivers and generators. Thus, two complete information channels over the four conductors 1,2,3,4 are provided in this circuit arrangement.

Superimposed upon the communication channels as described above, are means for supplying power from the control unit 10 to the terminal unit 20 via the phantom pair comprising the center tap connections C3, C4 through the balanced conductors 1,2,3,4, to the center tap connections C1 and C2 of transformers T1 and T2. D.C. voltage sources 10, 12 each of voltage $E_1$ are connected in series with resistors R1 and R2 to center tap connections C3 and C4. Data from the terminal is superimposed on the d.c. level supplied by voltage sources 10, 12 by modulator 100.

In terminal 20, receiver circuit 150 responds to the d.c. voltage pulses appearing between center-tap connections C1 and C2 of transformers T1 and T2 and produces a data signal proportional to the data modulated by modulator circuit 100 in control unit 10. The output from receiver 150 is applied to logic circuits in the terminal for controlling various circuits and equipments within the terminal.

An a.c. high impedance element 600 is connected in series with voltage regulator 500 and constant current sink 300 to provide a circuit terminating phantom line 1,2 and 3,4 so as to substantially eliminate reflections on the line 1,2 and 3,4.

Data is transmitted from the terminal 20 to the control unit 10 over conductors 1,2,3,4 by applying terminal 20 data pulses to modulator 200, which switches a resistor 201 in and out of parallel connection with the phantom circuit connected to center taps C1 and C2, the current of which is being supplied by the control unit 10. Because constant current sink 300 draws constant current from the closed circuit, and because resistor R201 is switched in and out of parallel connection with the constant current sink, current modulation in synchronism with the terminal 20 data signals is produced on conductors 1,2,3,4.

The current pulses are sensed at the control unit 10 by receiver 400 by comparing the voltages across resistors R1 and R2 which are proportional to current changes through them. The data produced by receiver 400 is in response to the current modulation imposed by modulator 200 in terminal 20. Data signals received by receiver 400 are then applied to other logic circuits within the control unit 10 to provide information with respect to the status of different elements of terminal 20. For example, where terminal 20 is a key telephone station set, the data being supplied by logic circuitry within the terminal 20 to modulator 200 might be the status of different line keys in the station set or the status of an indicator, the status of a hold key or privacy release key, etc.

Power is supplied from the control unit 10 to the terminal 20 by applying d.c. current from the d.c. sources 10, 12 via the phantom circuit to terminal 20 where it flows through voltage regulator 500. Voltage regulator 500 divides and regulates the d.c. voltage supplied via the phantom circuit and applies the divided and regulated voltage levels to different elements within the terminal 20.

The invention allows simultaneous provision via only four conductors 1,2,3,4 the following: two complete communication channels between the control unit and the terminal, means to provide control information from the control unit 10 to the terminal 20, means to provide status and request information in the terminal 20 back to the control unit 10 and means to supply power from the control unit 10 to the terminal 20. As will be discussed below, means are also simultaneously provided to allow dial pulse signalling over the four conductors.

Detailed Description of the Voltage Modulator 100 in Control Unit 10

Figure 2:
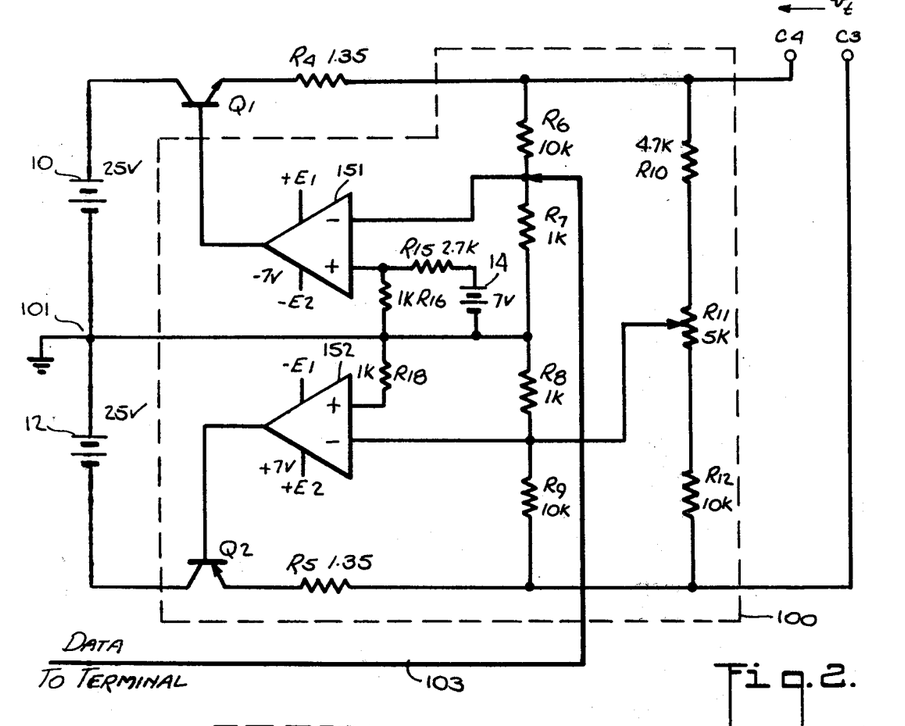
FIG. 2 shows the d.c. supply circuit and modulating circuit within the control unit for applying d.c. power and data signals to the four conductors connecting the control unit and terminal.

FIG. 2 shows the modulator 100 which applies data from the control unit 10 to the terminal 20 on the phantom circuit via transformer center tap connections C3 and C4. Voltage sources 10 and 12, being of the same voltage value (25 volts), are connected in series so as to force current in the same direction; that is from terminal center tap connection C3 via resistor R5 and the emitter-collector path of transistor Q2 and then through voltage sources 12 and 10 to the collector-emitter path of transistor Q1 and then to resistor R4 to the center tap connection C4. Transistors Q1 and Q2 are normally biased in their linear range so as to be almost fully conducting; that is, only a small voltage drop occurs across Q1 and Q2, and thus nearly the entire voltage source magnitude of voltage sources 10 and 12 appear across center taps C3 and C4.

The data to be transmitted from the control unit to the unit 10 to the terminal 20 is modulated within the circuit outlined by dashed lines and labelled 100. The circuit operates to vary the base biases of transistors Q1 and Q2 synchronously with the data input on lead 103. Thus, the voltage appearing from C3 to C4, $v_t$, is a modulated voltage from the average voltage, which is approximately the sum of source voltages 10, 12 (about 50 volts).

When a data pulse appears at the connection point between resistors R6 and R7, the voltage output of the differential amplifier 151 varies the base-emitter bias of transistor Q1 so as to create a voltage drop from the collector to the emitter of transistor Q1 in synchronism with the data pulse input of lead 103. Differential amplifier 152 is slaved to the output of transistor Q1 via resistors R10 and R11. Thus, the signal appearing at the emitter of transistor Q1 is also applied to the base of transistor Q2. The change in base-emitter bias of transistor Q2 causes a voltage drop from the emitter to the collector of transistor Q2 similar to that across the collector-emitter of transistor Q1. The voltage pulse appearing on lead 103 therefore also appears across the terminals C3 and C4 and is superimposed upon the d.c. voltage of sources 10, 12. Thus there is applied to terminals C3 and C4 a composite signal comprising the sum of voltages of sources 10 and 12 less the normal voltage drops across the emitter collector paths of Q1 and Q2, and the modulated voltage caused by the data pulses on lead 103.

Transistors Q1 and Q2 are of a kind denominated MPS U05 and MPS U55, manufactured by the Motorola Co. and are described at pages 1087 and 1107 in a publication by Motorola Semiconductor Products Inc. entitled "Semiconductor Data Library", Series A, Volume 3, 1974. Differential amplifiers 151 and 152 are of a type denominated LM 1458 manufactured by the National Semiconductor Company and are described at pages 2-238 in a publication by National Semiconductor Company entitled "Linear Integrated Circuits", published February, 1975. Biasing for the differential amplifiers is shown as in FIG. 2, and is provided by resistors R6 and R7 to provide the proper bias to the negative input of differential amplifier 151 and by resistors R15 and R16 in conjunction with voltage source 14 to the positive input terminal of differential amplifier 151. In a similar fashion, the biasing for differential amplifier 152 inputs is provided by resistor R18 to the positive input and by resistors R8 and R9 to the negative input terminal.

Detailed Description of the Voltage Regulator 500 in Terminal 20

Figure 3:
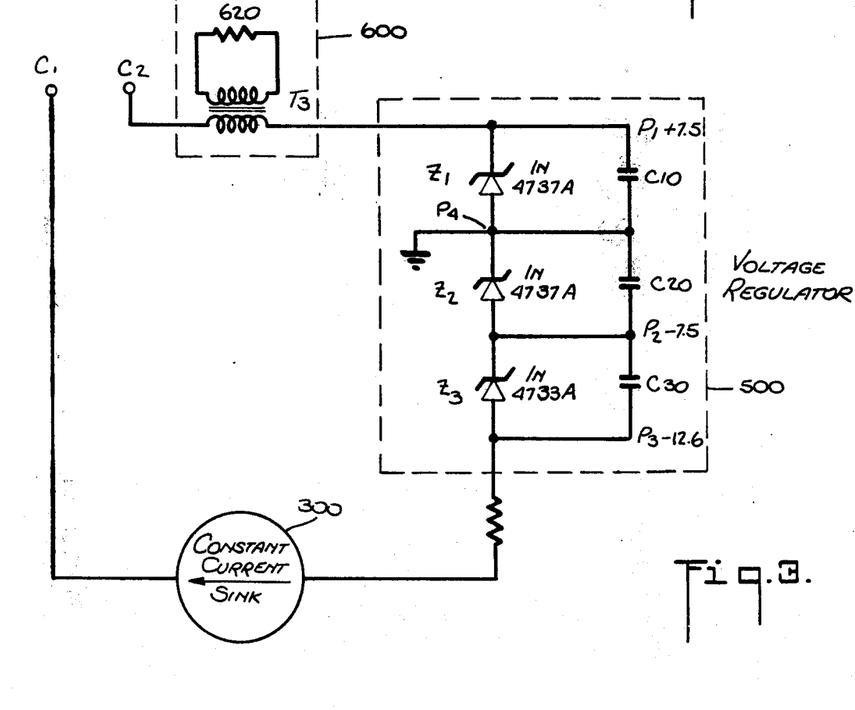
FIG. 3 shows details of the voltage regulator circuit located in the terminal for receiving the d.c. power from the four conductors and for providing different voltage levels with which to power the terminal logic circuits and components.

Connected to the center tap connections C1 and C2 in terminal 20 is a transformer T3, voltage regulator 500, and constant current sink 300, as shown in FIG. 3. The voltage regulator circuit 500 comprises a series connection of three Zener diodes Z1, Z2 and Z3 each of which has a capacitor connected in parallel with it. The Zener diodes sense the current flowing through the line from C2 to C1. With sufficient voltage applied across C1 to C2, each Zener diode breaks down having a constant voltage across it. The capacitors, C10, C20 and C30 connected across Zener diodes Z1, Z2 and Z3, provide filtering so as to provide a substantially constant voltage at points P1, P2, P3 and P4. The Zener diodes preferred in this invention are 1N4737A and 1N4733A diodes manufactured by Motorola Semiconductor Products, Inc. and are described at page 1-101 of a publication entitled "Semiconductor Data Library", Volume 1, Series A, 1974, by Motorola Semiconductor Products.

Point P4 between Zener diodes Z1 and Z2 is taken as an arbitrary reference point from which the voltage of other points P1, P2 and P3 may be measured. In the preferred embodiment as shown in FIG. 3, point P1 is 7.5 volts higher than point P4; P2 is 7.5 volts negative with respect to P4; and P3 is 12.6 volts negative with respect to P4. Points P1, P2 and P3 provide a supply of d.c. voltages to operate circuitry within terminal 20; they also provide power for biasing and powering the modulator 200, receiver 150 and the constant current source 300.

Transformer T3, acting as an indicator, is inserted in the series line between points C2 and C1 in order to provide a high impedance for the pulse transmission circuit in the control unit 10 in order to substantially prevent reflections from the terminal 20 as the pulses are transmitted from the control unit 10 to the terminal 20. In this regard the constant current sink 300 has an internal high impedance and therefore the impedance of transformer T3, as inserted into the line between points C1 and C2 and the impedance of constant current sink 300 create a balanced line, thereby substantially preventing reflections when pulses are transmitted.

Data Receiver in Terminal

Figure 4:
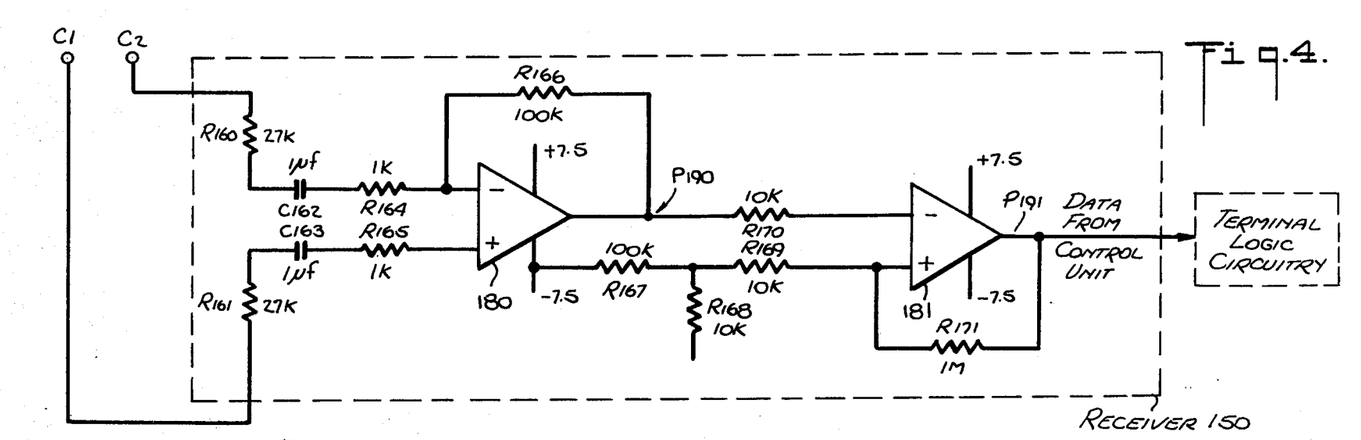
FIG. 4 shows the detailed circuit of the receiver located in the terminal which is responsive to the data signals generated in the control unit and applied to the four conductors connecting the control unit and the terminal.

FIG. 4 shows the details of receiver 150 in terminal 20. Data pulses are sensed on the line at terminals C1 and C2 which are the center tap connections of transformer T1 and T2. Voltage pulses modulated at the control unit by modulator 100 appear across the terminals C1, C2. These voltage pulses are then applied to operational amplifier 180 through resistor-capacitor paths created by resistors R160 and R161 and capacitors C162 and C163.

Operational amplifier 180 is connected as a differential amplifier such that the difference in voltages appearing at its plus and minus terminals are measured. Differential amplifier 180 operates to sense only the differences in voltage appearing at its input terminals, yet it is not sensitive to any common mode voltages which appear on both of its input terminal. This feature insures that any common mode voltages which appear on the conductors 1,2,3 and 4 connecting the control unit and the terminal will be rejected.

Operational amplifier 180 has a feedback resistor R166 connected from its output terminal to its negative input terminal thereby providing negative feedback and an overall gain across the amplifier from input to output. The signal appearing at point 190 thus represents the amplified difference in voltages appearing from center-tap points C1 and C2.

The signal at point P190 is applied to the operational amplifier 181 which is connected as a comparator amplifier. Amplifier 181 has a resistor R171 connected from its output terminal P191 back to its positive input terminal thereby insuring that voltage pulses applied to its negative terminal will not cause oscillation at its input. The output of the receiver 150 appears at point P191 from which the data pulses are applied to logic circuitry in the terminal for controlling various functions and apparatus in terminal 20. Operational amplifiers 180, 181 may be Motorola 1458 operational amplifiers identified above.

Description of the Current Modulator 200 in Terminal 20

Figure 5:
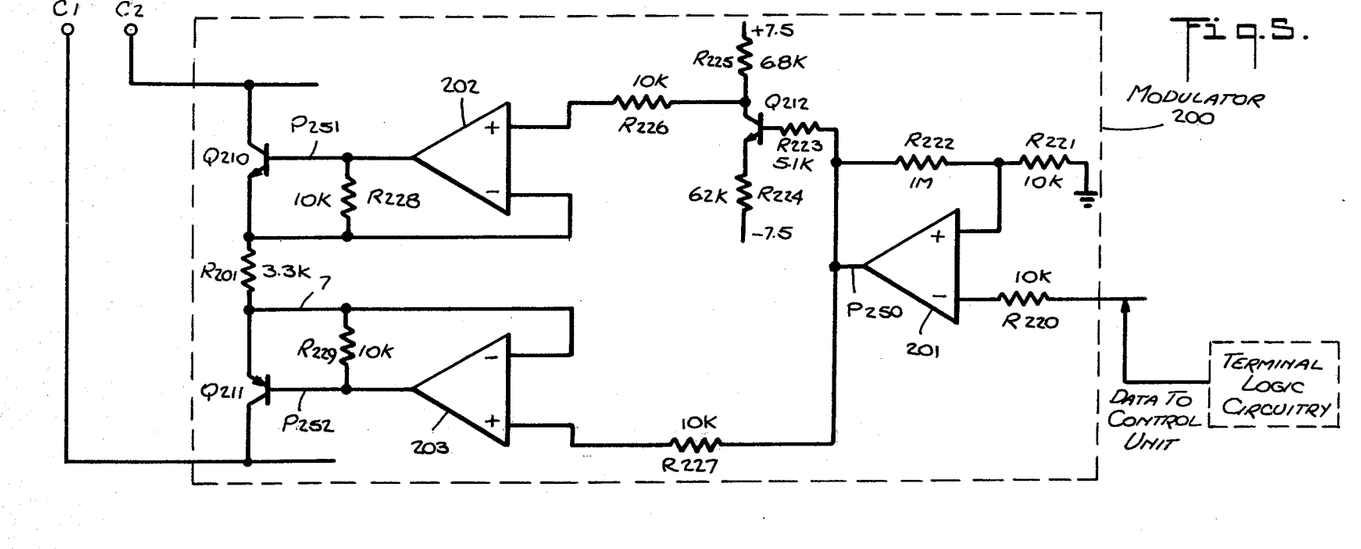
FIG. 5 shows the details of the current modulator circuit located in the terminal, responsive to data from the logic circuitry in the terminal, for applying current modulated pulses onto the four conductors connecting the control unit and the terminal.

The detailed circuitry of the modulator 200 shown in FIG. 1 is illustrated in FIG. 5. Terminal logic circuitry in terminal 20 applies data to the modulator 200 which is to be transmitted to the control unit for sensing information about the terminal. The data is applied to the negative terminal through resistor R220 of amplifier 201 which is connected as a comparator amplifier. A large resistor R222 is connected from the output of amplifier 201 back to the positive input which is connected via resistor R221 to a common point. This large resistor connected around the positive feedback path of amplifier 201 insures that the output of amplifier 201 at point P250 will not oscillate when the leading edges of pulses are applied to the negative input terminal of amplifier 201.

The pulses appearing at point P250 are applied first to a transistor Q212 via resistor R223 for inverting the pulse, which is then applied via resistor 226 to the positive input of amplifier 202. The pulse at point P250 is also applied to amplifier 203 at its positive terminal via resistor R227. The amplifiers 202 and 203 are connected as level shifting negative feedback amplifiers whereby the outputs of amplifiers 202 and 203 at points P251 and P252 serve to bias the transistors Q210 and Q211 to their full on condition when a data pulse is applied to the circuit.

Thus, the transistors Q210 and Q211 are turned on for the duration of the pulse, thereby connecting resistor R201 directly across the line defined by terminals C1 and C2. Referring to FIG. 1 it can be seen that when resistor 201 is in parallel across the phantom circuit line defined by center-taps C1 and C2, it changes the current supplied from control unit 10 via the phantom circuit defined by transformers T1, T2, T3, T4 and line conductors 1,2,3,4 to equal current through R201 and constant current sink 300. When resistor 201 is not connected across center-taps C1 and C2, the current drawn from the line 1,2,3 and 4 is less than when it is in the circuit. Thus, by modulating the resistance connected in parallel to the phantom circuit between C1 and C2 by means of turning the transistors Q210 and Q211 off and on in synchronism with the data applied to the modulator 200, current pulses are applied in synchronism with the data applied to the modulator to the phantom circuit. Amplifier 201 is an LM 339 voltage comparator and amplifiers 202 and 203 are LM 1458 operational amplifiers. The LM 339 and LM 1458 amplifiers are described at pages 3-32 and 2-238 of the catalog entitled "Linear Integrated Circuits" by National Semiconductor Co. Transistors Q210, Q211 and Q212 are respectively transistors MPS A05, MPS A55 and MPS A05 transistors manufactured by Motorola Semiconductor Products, Inc. and are described at pages 976-977 of a publication entitled "Semiconductor Data Library", Volume 3, Series A published by Motorola Semiconductor Products, Inc.

Detailed Description of the Control Unit Data Receiver

Figure 6:
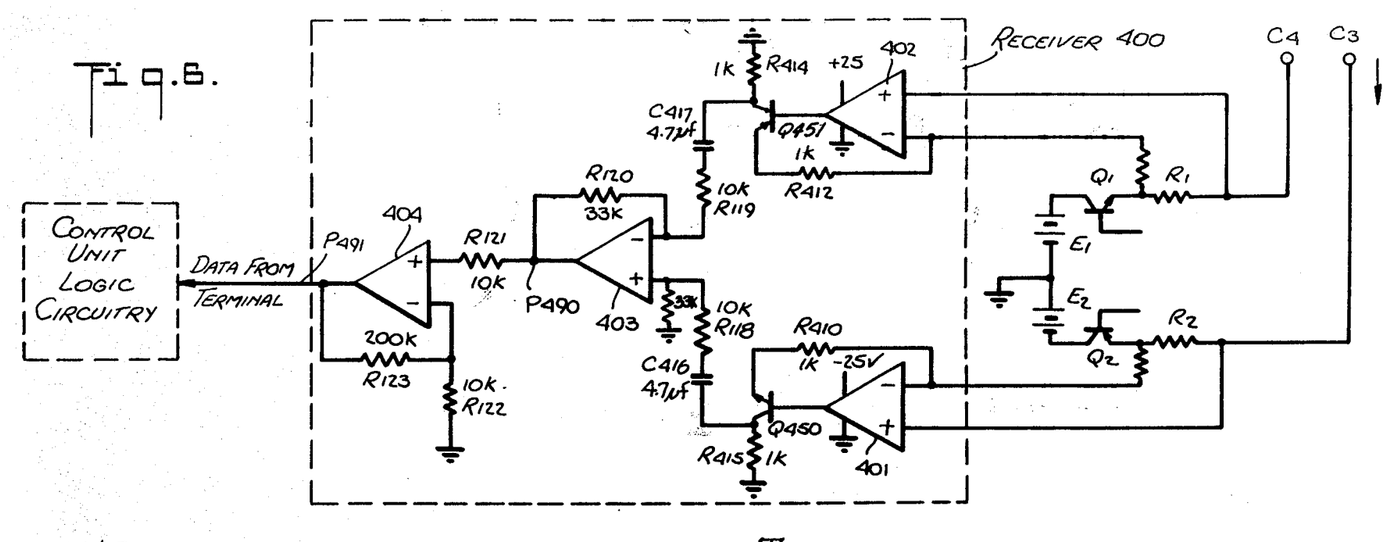
FIG. 6 shows the circuit in the control unit which senses the current modulation from the terminal which is applied to the four conductors connecting the control unit and the terminal.

FIG. 6 illustrates the current pulse modulation receiver 400 which responds to the current pulses applied to the phantom circuit via conductors 1,2,3,4 from terminal 20. The pulses appear as current pulses through resistors R2 and R1 which terminate at center tap connections C3 and C4. These voltage pulses across R2 and R1, proportional to the current pulses, are applied to operational amplifiers 401 and 402 which are connected in differential mode. The output of amplifiers 401 and 402 are then applied to transistors Q451 and Q450 for the purpose of shifting the level of the pulses at the outputs of amplifiers 401 and 402. The output from the collectors of Q451 and Q450 are then applied via capacitor and resistor series circuit to the positive and negative inputs of operational amplifier 403 which is connected in a differential voltage mode. The output of operational amplifier 403 at point 490 is then applied to amplifier 404 which is connected as a negative feedback amplifier with gain.

Thus, as a result of the current pulses applied to resistors R1 and R2, an output from amplifier 404 at point P491 results which recreates the pulse supplied to the current modulator 200 at the terminal 20. These data pulses are applied to the control unit logic circuitry for monitoring the operation of the terminal. Amplifiers 401, 402, 403, 404 are LM 1459 operational amplifiers manufactured by National Semiconductor Co. and are the same as described above. Transistors Q450 and Q451 may be transistors MPS A05 and MPS A55 manufactured by Motorola and are the same as described above.

Description of the Data Pulses Applied to the Line

FIG. 7 illustrates a preferred format for the data pulses which are applied to conductors 1,2,3,4 by the control unit 10 and the terminal 20. Each period of time T, typically 20.4 milliseconds, is broken up into thirty-four 600 microsecond segments. The first word, called the "0th" word, is used as a synchronizing interval by the terminal 20 logic circuitry to determine the start of the periodic word sequence. The next 33 time segments, or words, are used in sending and receiving data between control unit 10 and terminal 20.

Each word is further divided into five intervals. Although, in general, the intervals may be divided equally in time for each word, the preferred format in this invention calls for the thid, fourth and fifth intervals to each be equal in time length, L, while the first interval is specified to be $\frac{1}{2}$ L time length and the second time interval is specified to be 3/2 L time length. Time length L is specified to be 120 microseconds, so as a result time intervals one through five, when summed, equal 5L for a total of 600 microseconds. The data from the control unit 10 to the terminal 20 is applied during the first two of the intervals. Data returning from the terminal 20 is applied during interval four. Intervals three and five remain idle.

Each word can be designated to correspond to a particular function or element of the terminal 20. The control unit 10 ligic circuitry then scans each function once every 20.4 milliseconds and applies information during the first and/or second interval of a word. Logic circuitry in the terminal 20 uses the information to control corresponding functions or physical equipment in the terminal. Current pulse information regarding the status of a particular function or element is transmitted during the fourth interval of each word from the terminal 20 via the four conductor 1,2,3,4 phantom circuit and is received in the control unit 10 for use in making logic decisions for controlling the various elements and/or functions of terminal 20.

Figures 7A, 7B:
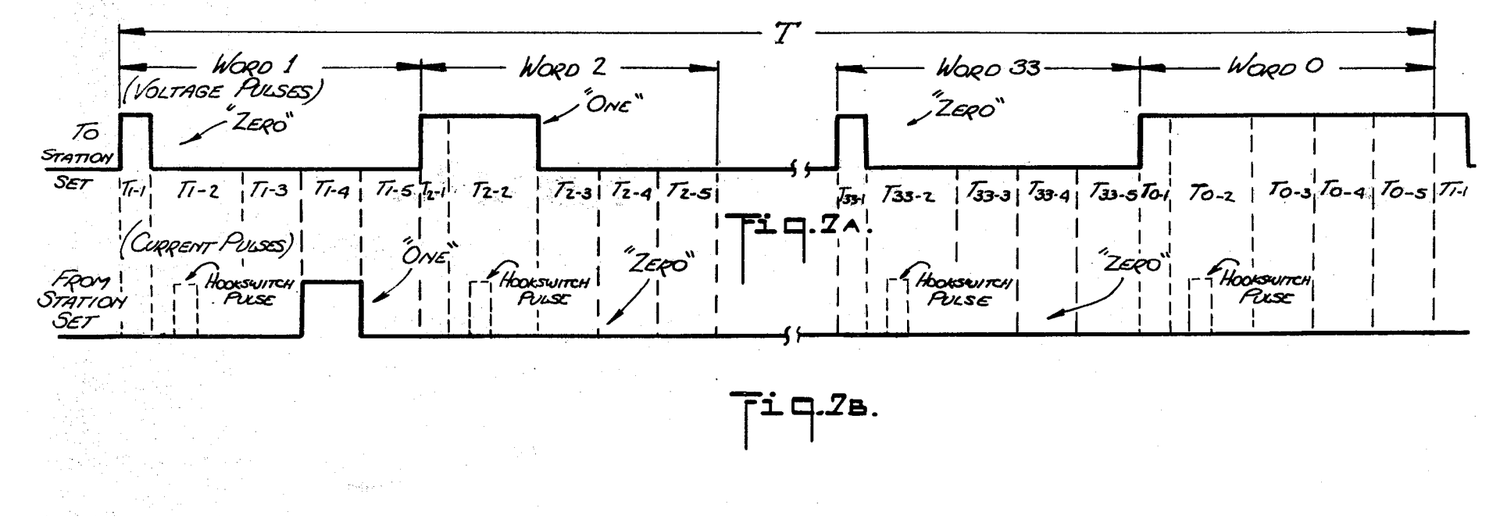
FIGS. 7A and 7B show the data format with which the modulators in the control unit and the terminal provide information to and from the control unit and the terminal.

FIG. 7A illustrates how information pulses from control unit 10 to terminal 20 are applied. The first voltage pulse in time slot "1" (e.g., $T_{1-1}, T_{2-1} \ldots T_{34-1}$) is always present, thereby allowing logic circuitry in terminal 10 to determine exactly when a new word is beginning. In any word the control unit 10 applies a "1" pulse during the time interval "2" by maintaining the voltage pulse high. That is, as illustrated for "word 2" of FIG. 7A, the voltage pulse extends from $T_{2-1}$ through $T_{2-2}$ without returning to zero. In any word, the control unit 10 applies a "0" pulse during the time slot "2" by removing the voltage pulse existing during the time slot "1". FIG. 7A illustrates how a "9" pulse is applied during Word 1 and Word 33, where during the intervals $T_{1-2}$ and $T_{33-2}$ no voltage pulse is being applied.

FIG. 7B illustrates how current pulses from the terminal 20 are impressed on the phantom circuit conductors 1,2,3,4 for reception by control unit 10 logic circuitry. A current pulse applied during the fourth interval of a word, as in Word 1 of FIG. 7B, indicates that a "1" is being transmitted from terminal 20 to control unit 10. The absence of a current pulse applied during the fourth interval of a word, as in word 33 of FIG. 7B, indicates that a "0" is being transmitted from terminal 20 to control unit 10.

The preferred use of the above-described data format is in a four-conductor communication circuit connecting a centralized key service unit with one of a plurality of key telephone station sets. In such an embodiment, each particular word of the time period T is used to provide information for the control of and/or status of line keys, indicators, hold keys, speaker-phone circuit, etc. Although thirty-four words are shown in this specification for purposes of demonstrating the preferred embodiment of the data format of this invention, any number of words may be used to correspond with the number of keys indicators and auxiliary circuits existing in a particular key telephone system.

Another feature of the data format part of this invention relates to the manner in which information relating to the status of the hookswitch and dial pulsing of the telephone station set is transmitted to the key service unit (as a specific embodiment of the control unit 10) from the telephone station set (as a specific embodiment of the terminal 20). As illustrated in FIG. 7B, during each word, short width current pulses during time interval two, are transmitted from the telephone station set over the phantom circuit of conductors 1,2,3,4 to the key service unit, whenever the hookswitch is open and the speaker phone is not operational. Time interval two is selected in the preferred embodiment of the invention so that the frequently occurring hookswitch current pulses are generated during the long time interval two of each word which is 3/2 L in the time length. This design facilitates reception of the hookswitch pulses in the key service unit since the relatively short hookswitch pulses do not overlap the ends of the time interval. A hookswitch signal is applied from the key telephone station set under two conditions: (1) when the status of the telephone station set is "on hook" (on hook status occurs when the hookswitch is open and the speakerphone is not operational) or (2) when a dial pulse from a rotary dial associated with the telephone station set is generated.

Thus, when the station set has an "on hook" condition, current pulses during the second interval of each word are transmitted and continue to be transmitted until the on-hook status is terminated (by the handset being taken "off-hook" or by the speakerphone being turned on). During dial pulse signalling, the current pulses are applied during the second interval of each word during, but only during, the generation of each dial pulse. The time period for each word of the data format, illustrated in FIG. 7A, is sufficiently short with respect to the length of a dial pulse that many "hookswitch" current pulses are transmitted, one each during each of the words of the data format. The presence or absence of current pulses received by the key service unit in the second time interval indicate that a dial pulse is being transmitted from the key telephone set.

Thus, the novel data format of this invention, in combination with the four wire communication circuit, allows either telephone stations adapted for dial pulse signalling, or telephone stations adapted for frequency signalling to be connected to the key service unit by means of the communication circuit. Frequency signals are applied over one of the communication channels, 1,2, or 3,4 while dial pulse signals are transmitted over the four conductor phantom circuit 1,2,3,4 by means of the data format as discussed above.

The advantages of the present invention, as well as certain changes and modifications to the disclosed embodiment thereof, will be readily apparent to those skilled in the art. It is the applicants' intention to cover all those changes and modifications which could be made to the embodiment of the invention herein chosen for the purposes of the disclosure without departing from the spirit and scope of the invention.

What is claimed is:

1. A circuit arrangement providing first and second communication channels, power feed and bi-directional signalling between first and second equipment units comprising, four conductors the ends of which are connected between the first and second equipment units, a first pair of said conductors providing a first information channel between the first and second equipment units, and a second pair of said conductors providing a second information channel between the first and second equipment units, first and second transformers for inductively coupling associated first communication channels in the first and second equipment units via said first conductor pair, each of the windings of said first and second transformers connected to said first conductor pair having a center tap connection, third and fourth transformers for inductively coupling associated second communication channels in the first and second equipment units via said second conductor pair, each of the windings of said third and fourth transformers connected to said second conductor pair having a center tap connection, means in the first equipment unit connected via said center taps of said first and third transformers to said first and second conductor pairs at the first equipment unit for (a) applying voltage to said four conductors, (b) applying voltage-modulated data signals to said four conductors for transmission from the first equipment unit to the second equipment unit, and (c) receiving current-modulated data signals transmitted from the second equipment unit on said four conductors, and means in the second equipment unit connected via said center taps of said second and fourth transformers to said first and second conductor pairs at the second equipment unit for (a) receiving and regulating said voltage applied to said four conductors in the first equipment unit and applying said voltage to power the second equipment unit, (b) receiving voltage-modulated data signals on said four conductors from the first equipment unit, and (c) applying current-modulated data signals to said four conductors for transmission from the second equipment unit to the first equipment unit.

2. The circuit of claim 1 wherein:

a first winding of said first transformer is provided to connect to said first conductor pair in the first equipment unit, and a second winding of said first transformer is connected to the first communication channel in the first equipment unit, said first transformer having said center tap connection to its first winding, and a first winding of said second transformer is provided to connect to said first conductor pair in the second equipment unit, and a second winding of said second transformer is connected to the first communication channel in the second equipment unit, said second transformer having said center tap connection to its first winding.

3. The circuit of claim 1 wherein:

a first winding of said third transformer is provided to connect to said second conductor pair in the first equipment unit, and a second winding of said third transformer is connected in the first equipment unit to the second communication channel in the first equipment unit, said third transformer having said center tap connection to its first winding, and a first winding of said fourth transformer is provided to connect to said second conductor pair in the second equipment unit, and a second winding of said fourth transformer is connected to the second communication channel in the second equipment unit, said fourth transformer having said center tap connection to its first winding.

4. The circuit of claim 1 wherein said means in the first equipment unit for applying voltage to said four conductors comprises:
a direct current voltage supply means, the positive potential terminal of said supply means being connected in series arrangement with a first switching means to force current to said center tap connection to the transformer winding connecting one of said two conductor pairs to the first equipment unit, and the negative potential terminal of said supply means connected in series arrangement with a second switching means to receive current from said center tap connection to the transformer winding connecting the other one of said two conductor pairs to the first equipment unit.

5. The circuit of claim 4 wherein said direct current voltage supply means in the first equipment unit comprises
two direct current supply sources of voltage, connected in series so as to force current flow in the same direction.

6. The circuit of claim 4 wherein said first and second switching means are first and second transistors, the emitter-collector terminals of which are respectively connected in series paths between said center tap connections and said terminals of said supply means, the impedance between the emitter and collector of each transistor being controlled by voltages applied to the base terminal of each transistor.

7. The circuit of claim 6 wherein the means in said first equipment unit for applying data signals on said four conductors from the first equipment unit comprises
circuit means responsive to data signals generated in the first equipment unit for applying signals corresponding to said data signals simultaneously to the bases of said first and second transistors, thereby varying the collector-emitter voltage drops of said first and second transistors connected between said direct current voltage supply means and said center taps of said first and second conductor pairs, in synchronism with said first equipment unit data signals.

8. The circuit of claim 4 wherein said means in the second equipment unit for receiving and regulating said voltage applied on the four conductors from the means in the first equipment unit comprises
at least one parallel-connected Zener diode and capacitor, the parallel connection being connected in series arrangement between said center tap connections to said transformers connected to said first conductor pair and to said second conductor pair.

9. The circuit of claim 4 wherein said means for receiving data signals in the second equipment unit which have been applied by the first equipment unit comprises,
a differential amplifier circuit responsive to voltage differences appearing at the center tap connections to said transformers connected to said first conductor pair and to said second conductor pair.

10. The circuit of claim 4 wherein said means in the second equipment unit for applying data signals on said four conductors from the second equipment unit comprises, a sink of constant current connected in series arrangement with said means for receiving and regulating the voltage from said means for applying a voltage in the first equipment unit, and
current modulator circuit means connected in the second equipment unit across said center tap connections to said transformer windings connected to said first and second conductors, and
circuit means responsive to data signals generated in the second equipment unit for applying signals to said current modulator circuit means, thereby switching an impedance across said center tap connections in said transformer windings connected to said first and second conductors in the second equipment unit in synchronism with said data signals generated in the second equipment unit, thereby varying the current flowing through said four conductors in synchronism with said data signals generated in the second equipment unit.

11. The circuit of claim 10 wherein said means in the first equipment unit for receiving data signals from the second equipment unit which have been applied by the second equipment unit to said four conductors comprises:
first and second series resistors connected in series arrangement respectively between said first switching means and said transformer center tap connection of the winding connecting one of said two conductor pairs in the first equipment unit and between said second switching means and said transformer center tap connection of the winding connecting the other one of said two conductor pairs in the first equipment unit, and
means for sensing voltage changes across said first and second series resistors which result from said current variations applied on said four conductors generated in synchronism with said data signals from the second equipment unit.

12. The circuit arrangement of claim 10, further comprising:
an inductor in series arrangement with said sink of constant current and said means for receiving and regulating said voltage from said means for applying a voltage in the first equipment unit, said inductor being selected so that the impedance of said inductor, sink of constant current and means for receiving and regulating voltage connected to said center taps of said second and fourth transformers at the second equipment unit is a very high impedance, thereby facilitating the absorption of voltage pulses transmitted from the first equipment unit to the second equipment unit and facilitating the generation of current sink pulses for transmission from the second equipment unit to the first equipment unit.

* * * * *